May 4, 1926. Re. 16,344

A. L. POWELL

TRANSMISSION FOR ENGINES

Original Filed Dec. 8, 1920 3 Sheets-Sheet 1

Inventor

Alvah L. Powell

May 4, 1926. Re. 16,344

A. L. POWELL

TRANSMISSION FOR ENGINES

Original Filed Dec. 8, 1920 3 Sheets-Sheet 2

Inventor

Walter L. Powell

May 4, 1926. Re. 16,344

A. L. POWELL

TRANSMISSION FOR ENGINES

Original Filed Dec. 8, 1920 3 Sheets-Sheet 3

Inventor

Alvah L. Powell

Reissued May 4, 1926. Re. 16,344

UNITED STATES PATENT OFFICE.

ALVAH L. POWELL, OF MILES CITY, MONTANA, ASSIGNOR TO THE A. L. POWELL POWER CO., OF MILES CITY, MONTANA, A CORPORATION.

TRANSMISSION FOR ENGINES.

Original No. 1,384,335, dated July 12, 1921, Serial No. 429,168, filed December 8, 1920. Application for reissue filed March 16, 1923. Serial No. 625,672.

DIVISION B.

*To all whom it may concern:*

Be it known that I, ALVAH L. POWELL, a citizen of the United States, residing at Miles City, in the county of Custer and State of Montana, have invented certain new and useful Improvements in Transmissions for Engines, of which the following is a specification.

This is a division of reissue application No. 625,671, filed on this day.

It has been known for many years that a long piston stroke is highly desirable in an internal combustion engine. However, it was not practicable to materially increase the size of an automobile engine. In automobiles of ordinary construction the diameter of the crank circle is exactly equal to the distance through which the piston moves. It would therefore be necessary to increase the height of the engine two inches for each additional inch of the radius of the crank circle.

My invention relates to improvements in the transmitting members of engines whereby is is possible to increase the piston travel without a proportional increase in the dimensions of the engine or motor.

It has furthermore been a fact of common knowledge that it would be desirable to decrease the enormous number of explosions in the explosive chamber of an automobile engine.

My invention makes it possible to materially decrease the number of these explosions without diminishing the power output. Incidentally my invention, by diminishing the number of explosions, diminishes the overheating of the engine and thereby saves much oil and either diminishes or eliminates many injurious results among which might be mentioned backfiring and the loss of energy through radiation of the heat of the overheated engine.

Engineers are agreed that a lower engine speed would allow a more complete burning of the explosive gasses in an automobile engine and as a result a large part of the power which now escapes in the exhaust is utilized when my improvement is incorporated in the engine structure. Likewise it is advantageous to have a long stroke in a steam engine so that the maximum expansion of the steam may be possible. In either an explosive engine or a steam engine my improvement saves much power which is now wasted.

My invention relates to improvements in the transmitting members of engines by which I establish any desired relation between the piston travel and the diameter of the crank circle which enables me to obtain advantages in the operation of such engines that are impossible with the construction at present used. My improvement incorporates a lever between the piston and crank rod which establishes any desired relation between the piston travel and the diameter of the crank circle so that while this piston may move, say, six inches, the diameter of the crank circle will be only four.

The lever to which I refer is, therefore, a means for reducing the engine speed, the additional force developed in the longer stroke of the piston enabling the mechanism to transmit greater power to the crank than is obtained in engines of ordinary construction. In the majority of heat engines it is desirable to reach the theoretical power at a minimum speed. Certain very useful types of these engines are handicapped by the great number of revolutions per minute necessary to develop the power for which they were designed. In the explosion engine in particular, that is those in which air and gaseous vapor are mixed and ignited, high speed is the rule. In my invention I am able to reduce this; the additional cylinder space, and consequent increase of piston stroke, lengthening the interval of movement with reference to time, thus effecting a slowing down of the engine without reducing power.

In all engines intended for high duty this is desirable. Marine engines of the explosion class transmit power to the driving shaft through system of costly gearing which involve greater friction than occurs in direct connecting gear of reciprocating steam engines. This greater wear is an essential defect in all such power machines. On the other hand, by using the additional working area in the cylinder I am able to produce a further expansion of the charge, with a consequent increase of thermal efficiency; or I may increase the volume of the charge and power of the engine at the same time, securing from it the working advantages of an engine of, say, six inch stroke restricted to a crank circle of four inches diameter thus raising the torque of the engine shaft. To go further, I may utilize this extra part of the stroke as a cooling means, as hereinafter to be described. In engine design this relation of piston stroke to crank stroke effects a reduction of cylinder surface, with reference to crank power, of great importance to the designer, as a minimum of radiation surface for given horse-power is made possible.

Many modifications of the lever principle I employ are possible, but I have confined my description to a specific form, embraced in the drawing annexed, but I include in the views covered by the drawings some modifications of the main design, and some applications of my invention to standard types of engines.

Figure 1:
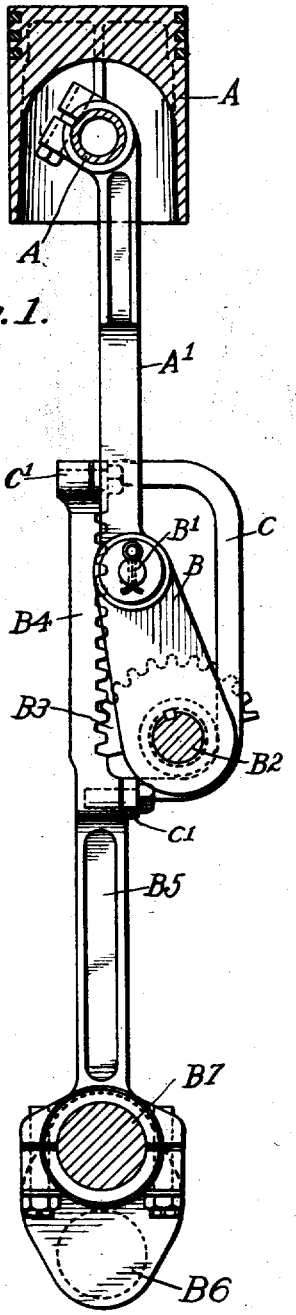
Figure 1 is a view in elevation of the construction of the lever mechanism.

In Figure 1 the piston A of a gas engine transmits motion through the piston rods, or links, $A^1$, $A^1$, mounted on a pin, $A^2$, that passes through the piston walls. These links are held on the pin by means of the bolt shown, and a bushing, $A^3$, is employed to allow for wear. The links $A^1$, $A^1$, connect with crank levers, B, B, by means of pins shown at $B^1$. The crank levers B, B, are attached to a pin, $B^2$, suitably supported in the engine frame. On the same pin there is a segmental pinion, $B^3$; this pinion, and the crank levers B, B, being keyed to the pin $B^2$. The segmental pinion $B^3$ engages a rack, $B^4$, that forms part of a connecting rod, $B^5$. The connecting rod is attached to the shaft crank $B^6$, by a wrist pin $B^7$, the construction being conventional.

The connecting rod $B^5$ is provided with a yoke C in the nature of a guide and arranged to press against a loose collar on pin $B^2$. As the segmental pinion $B^3$ tends to force the rack away, the inner surface of C, pressing against the collar on $B^2$, holds it in proper alignment with reference to the movement of the connecting rod $B^5$.

Under the conditions described it is evident that on the outstroke of the piston the lever B will swing in an arc downward, rotating the pin $B^2$, and causing the segmental pinion to transmit movement to the toothed connecting rod, $B^5$. This rod rotates the shaft crank, $B^6$, thus transmitting the power developed in the engine cylinder to the engine shaft. The connecting rod will move in the guiding and retaining means provided by the guide or yoke C and the reciprocating motion of the said piston will be converted into a movement of rotation at the crank circle. It will be noted, however, that the lever B is attached to the piston links $A^1$—$A^1$ at a point such that the effective length of the lever B is greater than the radius of the pinion $B^3$. As shown in Figure 1 the ratio of the length of the lever B to the radius of the segmental pinion $B^3$ is approximately two; and the movement of the outer end $B^1$ of the said lever B will be greater than that of the engine piston A, from which it derives its motion. Power will be transmitted to the crank by the racked connecting rod $B^5$, from the segmental pinion $B^3$.

Figure 4:
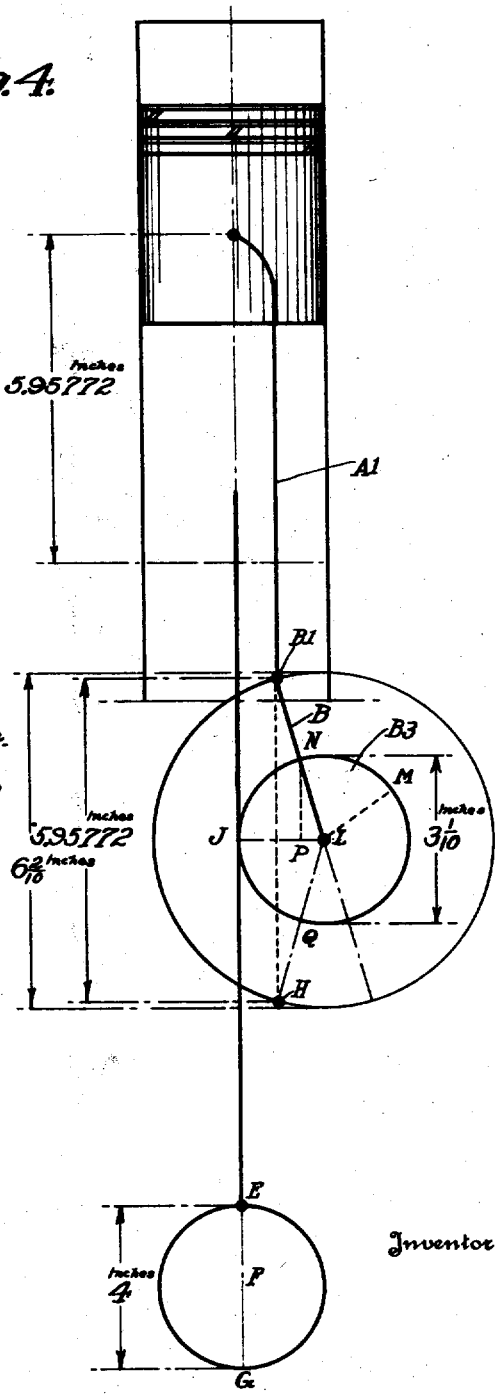
Figure 4 is a diagram to show the various movements involved.
Figure 5:
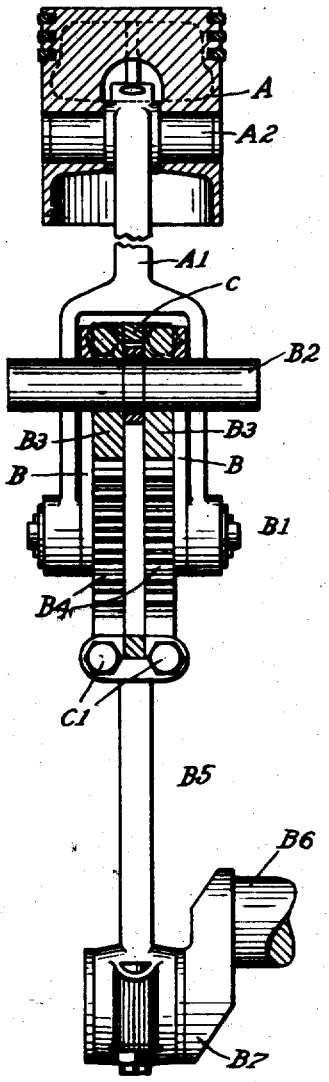
Figure 5 is a longitudinal section of the same, the parts being shown in elevation.

Referring to Fig. 4 the length of arc QJN is equal to EG, the vertical distance through which any point on the racked rod moves. Denote by $r$ the ratio of the short arm LN to the long arm $LB^1$ of the lever $LB^1$. Then the distance PN equals $$\frac{B^1H}{2r},$$

and $$\frac{B^1H}{2rLN}$$

equals sine ($JLB^1$); and half the arc QJN, or, JN equals EF, and $$\frac{EF}{LN}$$

equals (angle) $JLB^1$ (circular measure.) That is $$\frac{EF}{LN} \times \frac{2rLN}{B^1H} \text{ equals (angle) } \frac{JLB^1}{\text{sine } (JLB^1)};$$

cancelling, $$\frac{2rEF}{B^1H} \text{ equals (angle) } \frac{JLB^1}{\text{sine } (JLB^1)} \text{ (circular measure)}$$

And $$LN \text{ equals } \frac{EF}{(\text{angle})\ JLB^1\ (\text{circular measure})}$$

That is, twice the leverage ratio multiplied by the crank throw (in inches) and divided by the piston stroke (in inches) equals the circular measure of half the angle of oscillation divided by its sine; and the short arm of the lever (in inches) equals the crank throw (in inches) divided by the circular measure of said half angle. The expression $$(\text{angle})\ \frac{JLB^1\ (\text{circular measure})}{\text{sine}\ (JLB^1)}$$

may be solved by the "cut and try" method, three trials usually sufficing for the solution.

Thus of the four essential elements, crank throw, piston travel, length of lever and ratio of short to long arm, any one may be determined when the remaining three are given. These formulas may be expressed in the following form:

$$B^1H \text{ equals } 2(B^1L) \text{ cosine} \left[90^\circ\left(1-\frac{EG}{\pi(LN)}\right)\right]$$

In my preferred construction I contemplate using a crank having a throw of two inches, a pinion having a radius of 1.55 inches and a lever having a length of 3.1 inches. The piston travel may then be computed by the last mentioned formula. Evaluating:—

$$B^1H \text{ equals } 2\times3.1 \text{ cosine} \left[90^\circ\left(1-\frac{4}{3.1416\times1.55}\right)\right]$$

equals $2\times3.1$ cosine 16° 4 minutes 12 seconds equals 5.95773 inches, a value so nearly equal to six inches that the difference is immaterial.

With my improved construction it is possible to have a piston stroke of six inches and a crank diameter of four inches, the lower end of the pitman $A^1$ traveling eight inches around the arc $B^1H$, a point on the pitch circle of the pinion $B^3$ traveling four inches on the arc MNJ and the angular movement $B^1LH$ of the crank lever B being the same as the angular movement MLJ of the pinion $B^3$, each angle being 147° 51′ 36″.

The force developed in a long stroke is in this way compounded into the shorter stroke of a suitably connected crank, the effect being a leverage that gives the advantage of a six inch working piston stroke compounded into a four inch stroke of the working crank. These means are of a practical and effective form, adapted to long wear, and are simple with reference to structure.

Considering the crank as the short end of this compound lever and the primary moving element as the long end the circular motion of the short end will be approximately equal to the longer motion of the long end.

It is evident that in an engine cylinder the duration of piston stroke is a variable quantity, for as the length increases the time of travel increases, other factors being equal. The speed of shaft rotation will, therefore, be less in an engine of long stroke than in one of short stroke, compression and back pressure remaining the same, but the transmitted power will correspond to the force developed during the piston stroke. It is obvious that the ratio of the piston stroke to the engine crank diameter may be varied by alternating the distance of the pin $B^1$ or the pitch circle of the pinion $B^3$ from their centre of oscillation L in accordance with above formulas.

In an engine of this type the additional piston travel may be utilized for other purposes than that of the direct developement of power, but securing thereby advantages equivalent thereto. Let it be assumed that in an engine of relatively small diameter the piston stroke is twelve inches. The expansive force of the charge will exert pressure against the piston for a distance and time corresponding to the fall of temperature of the expanding charge, and this will insure power development to a point approximately beyond the middle of the stroke; that is, for a distance greater than six inches. The piston will, thereafter, travel by the momentum of the crank mechanism, absorbing power from it and acting as a braking, or retarding means, lowering engine speed. At a point in the long stroke a condition of partial vacuum will develop in the cylinder, which will tend to lower the temperature of the spent gases and, further, lead to an absorption of heat from the cylinder and piston walls. At the end of stroke, when the exhaust valve opens, atmospheric pressure will be restored in the cylinder; and on the downstroke the incoming air will absorb the heat from the engine walls. In an engine of this kind part of the stroke of the piston would develop power, while the remainder would act as a means for removing heat. While the action was taking place this would involve a loss of power, but the cooling effect on walls and piston would raise the efficiency of the engine as a whole. The point of exhaust could also be near, at or below atmospheric pressure permitting the expansion of the power charge to any desired point.

Figure 2:
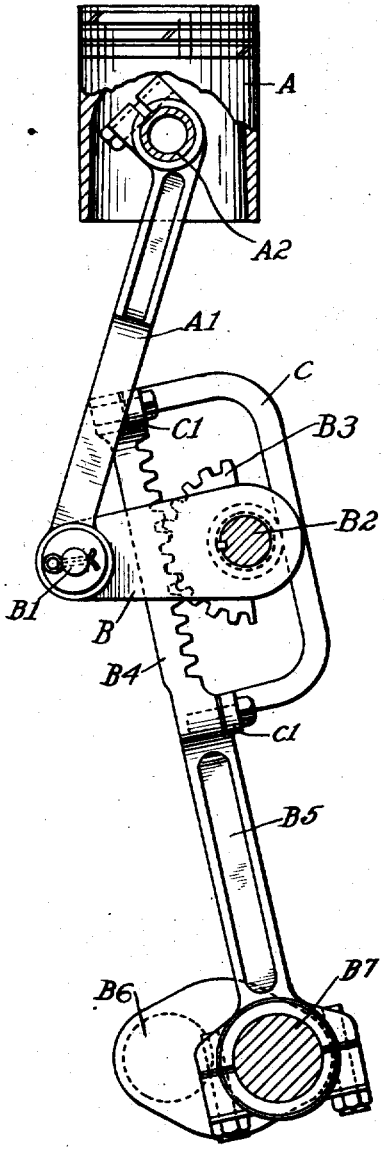
Figure 2 shows the parts shown in Figure 1 in another part of the stroke.
Figure 3:
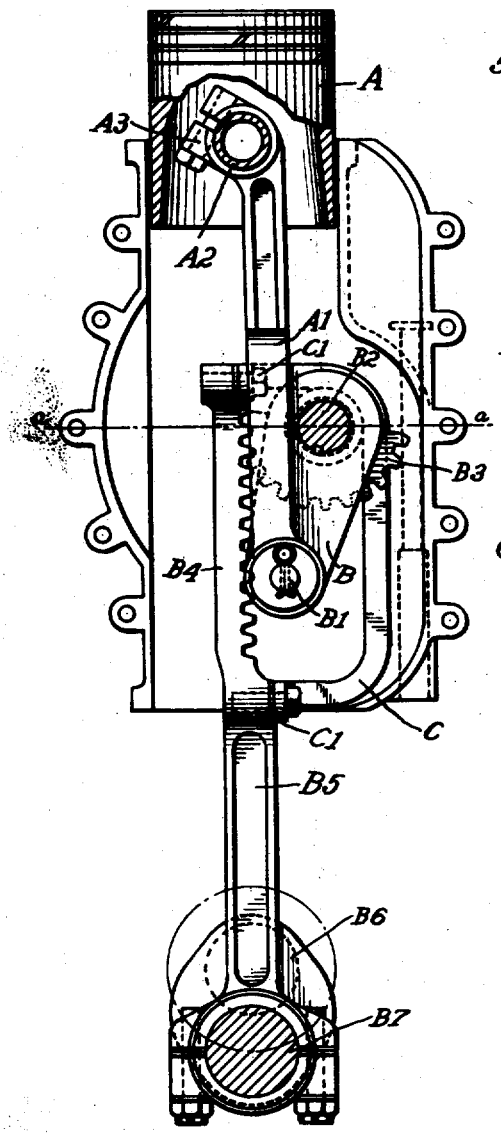
Figure 3 is same at end of stroke.
Figure 7:
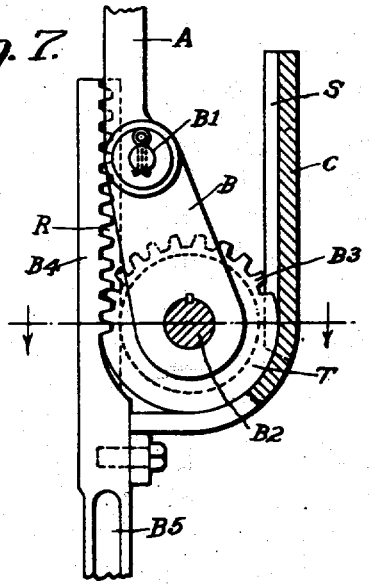
Figure 7 is a modification of the yoke supported rack, guide and pinion.
Figure 6:
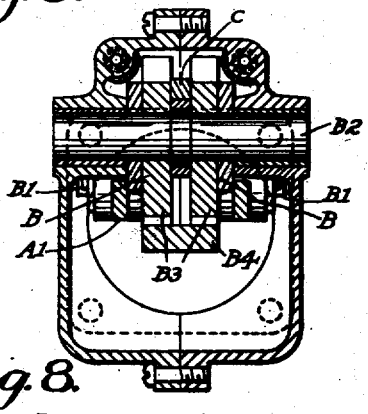
Figure 6 is a transverse section on the line *a—a*, Figure 3.
Figure 8:
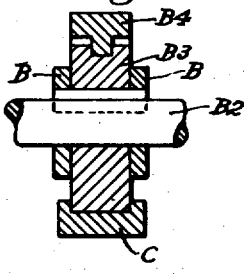
Figure 8 is a sectional view on the dotted line of Figure 7, looking in the direction of the arrows.

In Figures 7 and 8 I show a modification of the guide C and rack $B^4$. The guide C may be formed with a trackway S adapted to bear against a smooth portion T of the pinion $B^3$. The rack bar $B^4$ may be provided with side bars or rails R to further insure the proper contact or meshing of the pinion $B^3$ with the teeth of the rack $B^4$. The guide C may be attached at its upper and lower ends to the connecting rod $B^5$ as is shown in Figures 1, 2 and 3 or it may be attached only at its lower end as is shown in Figure 7.

It is evident that many forms of my invention may be made, and that the proportions of leverage to stroke can be changed to meet various conditions. I do not limit myself to the exact forms of the invention shown in this application.

What I claim to be novel and ask to have protected by Letters Patent is:—

1. An oscillating connecting rod, a rack thereon, an actuating pinion in mesh with the rack, guide rails for the pinion on each side of the rack and a means for maintaining the pinion in mesh with the rack, said means including a guide attached to the connecting rod, said guide having side rails to guide the rack.

2. In a transmission member, the combination of a cylinder, a piston in said cylinder, a lever pivoted in relation to said cylinder, means operatively connecting said lever and piston, a pinion operatively connected to said lever and having a pitch radius different from the length of said lever, a rack engaging said pinion, a guide carried by the rack for holding said rack in engagement with said pinion, said guide having side rails to guide the rack and a power shaft rotatable by the movement of said rack.

3. In a transmission member the combination of a cylinder, a piston in said cylinder, a lever pivoted in relation to said cylinder, means for connecting said piston to said lever, a pinion having a pitch radius different from the length of said lever, means for moving the lever and pinion synchronously, a rack engaging said pinion, a guide mounted on the rack to hold the rack in engagement with said pinion, said guide having means to hold the pinion and rack in the same plane and a power shaft rotatable by the movement of said rack.

4. In an internal combustion engine, a cylinder, a piston slidable therein, a driven crank shaft, a lever, a pitman operatively connecting said piston and lever, a pin adapted to support said lever, a pinion mounted on said pin and adapted to be oscillated by the movement of said lever, a pitman operatively connected with said crank shaft, a rack carried by said pitman and adapted to mesh with said pinion and a yoke secured to the last mentioned pitman and adapted to extend to the side of the pin remote from said last mentioned pitman, said yoke serving as a means to hold the rack in engagement with the pinion, the length of the lever exceeding the pitch radius of the pinion whereby a longer piston stroke is obtained than is the diameter of the circle described by the crank.

ALVAH L. POWELL.